Figure 1:
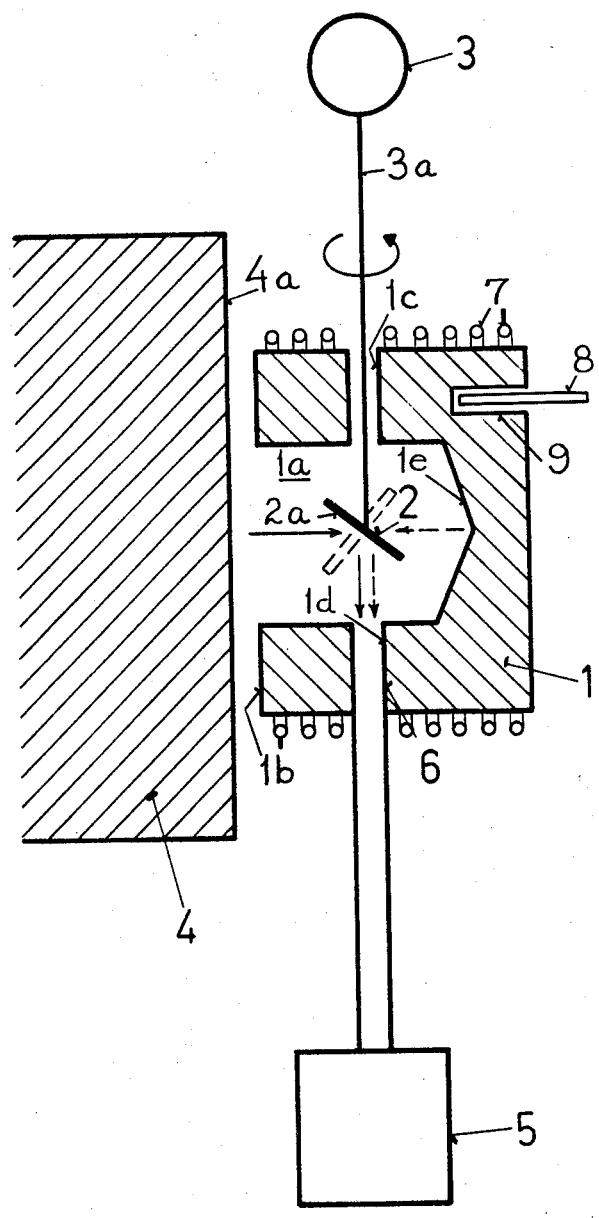

United States Patent [19]
Brandli et al.

[11] 3,924,469
[45] Dec. 9, 1975

[54] APPARATUS FOR MEASURING SURFACE TEMPERATURES OF OBJECTS BY INFRARED RADIATION THEREFROM

[75] Inventors: Gerold Brandli, Windisch; Pierre Keller, Baden, both of Switzerland

[73] Assignee: BBC Brown Boveri & Company Limited, Baden, Switzerland

[22] Filed: Mar. 11, 1974

[21] Appl. No.: 450,046

[30] Foreign Application Priority Data
Apr. 30, 1973 Switzerland.......................... 6098/73

[52] U.S. Cl. ............... 73/355 EM; 250/347; 356/48
[51] Int. Cl.² ........................ G01J 5/52; G01J 5/62
[58] Field of Search.... 73/355 R, 355 EM; 250/341, 250/347, 351; 356/43–48

[56] References Cited
UNITED STATES PATENTS

| | | | |
|---|---|---|---|
| 1,976,461 | 10/1934 | Prince................................. | 356/48 X |
| 2,837,917 | 6/1958 | Machler........................ | 73/355 EM |
| 3,146,622 | 9/1964 | Moses................................ | 73/355 R |
| 3,272,013 | 9/1966 | Astheimer......................... | 73/355 R |
| 3,392,282 | 7/1968 | Astheimer......................... | 250/351 |
| 3,465,589 | 9/1969 | Flook................................. | 73/355 R |
| 3,492,869 | 2/1970 | Toyota et al..................... | 73/355 EM |
| 3,722,282 | 3/1973 | Loy................................... | 73/355 R |

*Primary Examiner*—Richard C. Queisser
*Assistant Examiner*—Frederick Shoon
*Attorney, Agent, or Firm*—Pierce, Scheffler & Parker

[57] ABSTRACT

Apparatus for measuring the temperature at the surface of an object by measurement of the infrared radiation emitted from its surface comprises a variably heated metallic body which serves as a compensating radiator, a reflective member mounted on a shaft within a cavity provided within the compensating radiator body for rotation, or alternatively oscillation, about an axis forming an oblique angle to the plane of the reflective member such that in one position of the reflective member only infrared radiation from the surface of the object is reflected by it into a radiation detector, while in another position of the reflective member only infrared radiation from a wall surface of the cavity within the compensating radiator is reflected by it into the radiation detector, thusly admitting infrared radiation from the object and compensating radiator in alternation to the radiation detector. The detector produces at its output an alternating current signal determined by any temperature differential existing between the object and compensating radiator, and the heat supply to the compensating radiator is varied in accordance with the signal in such sense as to reduce the signal to zero whereby the temperature of the compensating radiator then equals the temperature of the object.

8 Claims, 2 Drawing Figures

APPARATUS FOR MEASURING SURFACE TEMPERATURES OF OBJECTS BY INFRARED RADIATION THEREFROM

The present invention relates to an improved arrangement to measure and/or control the temperature of surfaces without physical contact and without limitation to the type of material, by means of infrared pyrometric measurement, whereby a radiative equilibrium if established between the object to be measured and a heated, compensating radiator, and is related to the subject matter of a pending U.S. Application Ser. No. 380,572, filed July 19, 1973.

Usually, a temperature measurement at surfaces without physical contact will be of lesser precision than the direct contact method but will always be required in certain instances, for example, in case of a moving object or where the surface of an object must not be damaged. With the exception of the possibility to attach dyestuff, dielectric media and other foreign substances to the object and to observe their temperature-related characteristics from a distance, there remains practically only one method of such measurement, namely, the radiant pyrometric method. The thermal radiation which is being emitted by all bodies represents in principle a strong signal which is very informative which, however, cannot be utilized fully by the majority of the radiation pyrometers because the emission factor of the object to be measured and the surrounding radiation, reflected by it, influence the value obtained by such measurements in a manner insufficiently known. In order to insure precise temperature measurements by use of thermal radiation, it is therefore important to keep away the surrounding radiation and to eliminate the emission factor by compensating radiation.

Several radiation pyrometers are known which utilize the above discussed principle. One of these devices compensates the radiation emitted by the object to be measured into black-body radiation by reflected radiation produced by a well-defined radiator. However, systems of this type are limited to objects with practically specular reflecting surfaces. In the case of another known pyrometer, a highly reflecting and integrating hemisphere is placed upon the object to be measured. However, difficulties will arise when smooth metal surfaces are being measured because the hemisphere does not reflect fully.

Finally, in the case of a third known apparatus, a blackened body is heated until the temperature gradient within the surface opposite the object to be measured disappears. The temperature is then determined by a thermometer in contact with the body. This arrangement has the disadvantage that it will act slowly time-wise, and that it will also respond to vertical air movements which often will interfere adversely.

In the above-referred to pending application, Ser. No. 380,572, filed July 19, 1973, which overcomes these disadvantages, the surface temperature of an object is measured by use of infrared pyrometry apparatus, which includes a variably heated compensating radiator, in that there is arranged between the radiator and the surface of the object a revolving bladed chopper wheel, with a reflecting coating on the side facing away from the object, thusly that during the rotation of the chopper wheel and at the time intervals when the radiation from the object to be measured is allowed to pass through the gaps between the blades of the chopper wheel, this radiation is measured during its further path of travel by means of an infrared detector, while during the periods of time when said radiation is masked by a blade of the chopper wheel, these periods of time alternating with said time intervals, radiation emitted by the compensating radiator is reflected by that surface of said blade which is facing away from the object to be measured and which is provided with the reflecting coating, and reaches the infrared detector in place of the masked radiation from the object to be measured, with the result that in case of radiative non-equilibrium — i.e. a difference in temperature between object to be measured and radiator — an a.c. signal will be generated at the output of the infrared detector, its frequency being controlled by the speed of the chopper wheel; this signal is conducted, after phase-responsive rectification, to a regulating device which will control the heat supply for the purpose of attaining a radiative equilibrium between object to be measured and radiator in such manner that the signal at the detector output becomes zero, thus indicating that the temperature, measured at the radiator, corresponds to the temperature of the object to be measured.

The pyrometric temperature measuring technique as disclosed in the mentioned pending application Ser. No. 380,572 filed July 19, 1973, could possibly entail some short comings which could arise as a consequence of utilizing a rotatable multi-bladed chopper wheel with a reflective coating on one side thereof for alternatingly admitting radiation from the surface of the object and from a surface of the compensating radiator to the detector. In particular, there arises the possibility, in the event of a strong air flow that the chopper will cool off and distort the measurements due to insufficient reflection and reduced characteristic radiation.

The object of the present invention is to provide an improved arrangement which eliminates this possible difficulty and achieves its purpose in that the paths of the radiation from the object and compensating radiator to the detector are made more symmetrical through use of a reflective plate-like member which is mounted on a shaft within a cavity provided within the compensating radiator for rotation or oscillation about an axis forming an oblique angle to the plane of the reflective member in such manner that in one position of the reflective member only infrared radiation from the surface of the object is reflected by it into the detector, while in another position of the reflective member, only infrared radiation from a wall surface of the cavity of the compensating radiator is reflected by it into the detector. Thus, infrared radiation from the object and compensating radiator are admitted to the detector in alternation. The paths of the infrared radiation from the object and from the compensating radiator are accordingly more symmetrical since both radiations arrive at the detector by reflection from one and the same reflecting surface rather than by admitting radiation from the object directly into the detector through the gaps between adjacent blades of the chopper wheel and admitting radiation from the compensating radiator indirectly by reflection from the blades of the chopper wheel. Otherwise operation of the pyrometric temperature measuring apparatus is the same as in the mentioned pending application Ser. No. 380,572.

Figure 2:
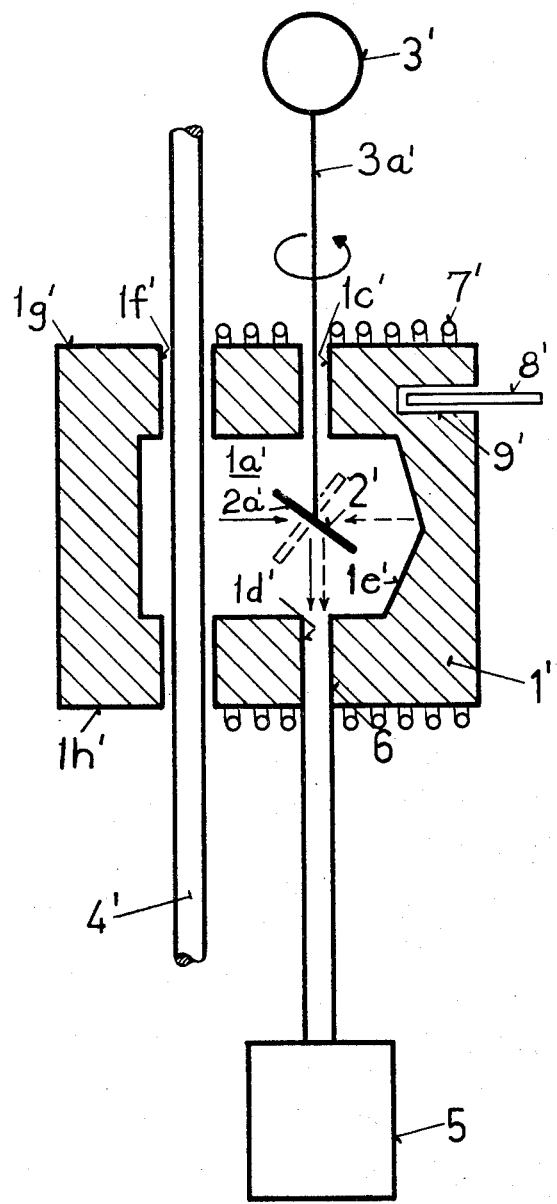

The foregoing as well as other objects and advantages inherent in the invention will become more apparent FIG. 1 is a diagrammatic presentation of the temperature measuring apparatus wherein the cavity provided in the compensating radiator opens to one face of the latter and adjacent to which is placed the surface of the object whose temperature is to be measured; and FIG. 2 is a view similar to FIG. 1 illustrating a modified embodiment for the compensating radiator which is particularly well suited for measuring the surface temperature of thin elongated objects, e.g. a metallic wire, the compensating radiator including a throughbore which communicates with the cavity and through which the wire is passed.

With reference not to FIG. 1, the compensating radiator comprises a preferably cylindrical metallic body 1 which possesses a good thermal conductivity characteristic, such as copper, and which is provided with a cavity 1a opening to face 1b and adjacent which is placed the surface 4a of the object 4 whose temperature is desired to be measured. Accommodated within the cavity 1a is a reflective plate-like reflecting member 2 which is mounted on a shaft 3a extending through a bore 1c in the radiator to the exterior to a driving motor 3. The plate-like member 2 is mounted on shaft 3a in such manner that the plane thereof forms an oblique angle to the shaft axis. The side of the reflective member 2 facing the object 4 and the inlet end of a radiation conduction pipe 6 located in another bore 1d leading from the cavity 1a to the exterior and thence into detector 5 is provided with a reflective coating 2a so that when the reflective member 2 is in the position indicated by solid lines, only radiation incoming from the surface of object 4 to the member 2 will be reflected into the radiation conductor 6. Whenn shaft 3a rotates member 2 in the direction indicated by the arrow through 180° to the position indicated by the broken lines, only radiation incoming from the wall 1e of the cavity 1a to the member 2 will be reflected into the radiation conductor 6. The preferred configuration of the plate-like reflective member 2 is elliptical with the major axis of the ellipse projected onto the plane of the drawing. The projection of the ellipse to the surface of object 4 to be measured is approximately circular, like the projection onto any plane at a right angle thereto. Thus, as shaft 3a and the reflective plate-like member rotate, infrared radiation from the surface of the object 4 and from the wall 1e of the cavity 1a will be admitted in alternation to the detector 5 via the radiation conductor 6.

In lieu of rotation of the plate-like reflecting member 2 continuously in one direction, the same desired effect can be established by oscillation of the member 2 about the axis of shaft 3a through an angle in the range between 60° and 180° between two terminal positions with the drive for shaft 3a being accomplished through pneumatically, hydraulically or electro-magnetically actuated motor means.

A heating coil 7 surrounds the periphery of the compensating radiator 1 for heating the latter, its power supply being controlled by an electronic control circuit, known per se and therefore not illustrated here, which receives the output signal from the infrared detector 5 in the form of a controlling pulse.

A contact thermometer 8 is provided and is insertable into a blind hole 9 in the body of the compensating radiator 1.

During normal operations, i.e. for temperature measurements, the shaft 3a rotates, or in the alternative oscillative manner as explained above, at a constant speed during which infrared radiation is alternatingly reflected into the detector 5 by the reflective side of the plate-like member 2 from the surface of object 4 and the wall 1e of cavity 1a. If there is no radiation equilibrium, i.e. if the temperature at the surface of object 4 and compensating radiator 1 differ, the respective amplitudes of the detector output signal obviously will vary, depending upon the radiation being received. With the exception of a d.c. component which is filtered out, there will appear across the detector output an a.c. signal, its phase differing by 180° dependent upon the temperature of the radiator 1 which may be either higher or lower than the temperature at the surface of object 4. This signal is rectified in relation to phase and is fed as a controlling pulse into the above discussed, not illustrated electronic device which regulates the current flowing through the heating coil 7 in accordance with the polarity of the controlling pulse (that is according to the phase of the detector output signal and thus the sign of the temperature difference between object and radiator as explained above) in such manner that the temperature of the radiator 1 is either increased or reduced, if it is lower, or higher respectively, than the temperature of the surface of object 4, until the a.c. voltage signal across the detector output, and with it the controlling pulse, disappears. At this moment radiation equilibrium, and thus temperature uniformity as between radiator 1 and object 4 to be measured is attained, and the radiator temperature — which is now also the temperature of the object — can be read from the contact thermometer 8.

The method proposed by the invention improves substantially the measurement of temperatures when compared with known pyrometric systems, and especially for objects with low emission factor temperatures ranging from room temperature to approximately 700°C.

The configuration of the compensating radiator illustrated in FIG. 1 is particularly well suited for measurement of the temperature of an object having a large surface area such as depicted by object 4. However, it is frequently necessary to measure the temperature at the surface of thin and elongated objects, e.g. a moving metallic wire. This problem can be solved by using a modified configuration for the compensating radiator as depicted in FIG. 2. There it will be seen that the compensating radiator 1' is seen to consist of a hollow metallic body, preferably in the configuration of a cylinder, depicted in diametral section which includes a throughbore 1f' extending through it between the plane end faces 1g', 1h' thereof. This bore intersects i.e. communicates with the cavity 1a' and provides a passthrough for the thin, elongated object, e.g. the wire 4' whose surface temperature is desired to be measured. Except for this difference, the remainder of the construction and the mode of operation is identical with that of FIG. 1 and hence corresponding parts and components have been designated with the same reference numerals, but with primes added for purposes of distinction.

We claim:

1. Apparatus for measuring the temperature at the surface of an object by measurement of infrared radiation emitted from the surface which comprises a compensating radiator in the form of a body having a good thermal conductivity characteristic, a radiation detector, a planar reflective member located within a cavity provided within said compensating radiator, said reflecting member being mounted at its center on a rotatable shaft extending through a bore in said compensating radiator to the exterior thereof for actuation by a motor to effect cyclic rotational movement about an axis forming an oblique angle to the plane of said reflective member between first and second positions such that in one such position only radiation from the surface of the object entering said cavity is reflected by said reflector member into said detector through a second bore in said compensating radiator aligned with said rotatable shaft while in the other such position only radiation from a wall surface of said cavity is reflected by said reflective member into said detector thusly admitting radiation from the object and compensating radiator in alternation to said detector, said detector producing at its output a signal determined in accordance with any radiation differential existing between the object and compensating radiator, and means controlled by said output signal for variably heating said compensating radiator in such sense as to reduce said signal to zero thereby to attain a condition of radiation equilibrium as between the object and said compensating radiator.

2. Apparatus as defined in claim 1 for measuring the temperature of an object by radiation emitted from a surface thereof wherein said reflective member rotates continuously in one direction and said first and second positions are located 180° apart.

3. Apparatus as defined in claim 1 for measuring the temperature of an object by radiation emitted from a surface thereof wherein said reflective member oscillates about its axis of rotation between said first and second positions.

4. Apparatus as defined in claim 3 for measuring the temperature of an object by radiation emitted from a surface thereof wherein the angle through which said reflective member oscillates lies in a range between 60° and 180°.

5. Apparatus as defined in claim 1 for measuring the temperature of an object by radiation emitted from a surface thereof wherein said reflective member has an elliptical configuration.

6. Apparatus as defined in claim 1 for measuring the temperature of an object by radiation emitted from a surface thereof wherein said compensating radiator includes a bore extending from said cavity to the exterior thereof and through which the object is inserted into said cavity.

7. Apparatus as defined in claim 6 for measuring the temperature of an object by radiation emitted from a surface thereof wherein the bore through which the object is inserted into said cavity extends completely through the compensating radiator.

8. Apparatus as defined in claim 1 wherein said second bore includes a radiation conductor.

* * * * *